United States Patent [19]

Krispin et al.

[11] Patent Number: 5,326,052
[45] Date of Patent: Jul. 5, 1994

[54] CONTROLLABLE HOSE-AND-DROGUE IN-FLIGHT REFUELING SYSTEM

[75] Inventors: Yaacov Krispin, Rockville, Md.; Mordekhai Velger, Rehovot, Israel

[73] Assignee: ENIG Associates, Inc., Silver Springs, Md.

[21] Appl. No.: 769,435

[22] Filed: Oct. 2, 1991

[51] Int. Cl.5 .............................................. B64D 39/00
[52] U.S. Cl. .................................................. 244/135 A
[58] Field of Search ................. 244/135 A, 161, 1 R; 342/23; 364/424.01, 460

[56] References Cited

U.S. PATENT DOCUMENTS

| | | | |
|---|---|---|---|
| 3,285,533 | 11/1966 | Jernigan, Jr. | 244/161 |
| 3,285,544 | 11/1966 | Chope et al. | 244/135 A |
| 3,917,196 | 11/1975 | Pond et al. | 244/135 A |
| 4,025,193 | 5/1977 | Pond et al. | 244/136 A |
| 4,072,283 | 2/1978 | Weiland | 244/135 A |
| 4,158,885 | 6/1979 | Neuberger | 244/135 A |
| 4,231,536 | 11/1980 | Ishimitsu et al. | 244/135 A |
| 4,288,845 | 9/1981 | Finsness et al. | 244/135 A |
| 4,519,560 | 5/1985 | Ishimitsu et al. | 244/45 R |
| 4,633,376 | 12/1986 | Newman | 244/135 A |
| 4,763,125 | 8/1988 | Newman et al. | 244/135 A |

OTHER PUBLICATIONS

Rayment *In-Flight refueling apparatus* (U.K. Patent Application 2 237 251), May 1991.
Ward, *Dead Reckoning Optoelectronic Intelligent Docking System* (WO87/02797), May 1987.

*Primary Examiner*—Michael S. Huppert
*Assistant Examiner*—Anne E. Bidwell
*Attorney, Agent, or Firm*—Browdy and Neimark

[57] ABSTRACT

An in-flight hose-and-drogue refueling system has the capability of steering the drogue using four thrusters which are energized by pressurized air. The system measures the drogue's 3-dimensional position relative to either the refueling aircraft or the probe on the receiver aircraft. A control system utilizes the measurements of the drogue's 3-dimensional position to activate the thrusters so as to either minimize the excursions of the drogue due to turbulence, thus enabling easier hook-up, or alternatively, to track the receiver's probe and automatically guide and contact the drogue to the probe.

27 Claims, 3 Drawing Sheets

CONTROLLABLE HOSE-AND-DROGUE IN-FLIGHT REFUELING SYSTEM

FIELD OF THE INVENTION

The present invention relates to automatic hook-up of a hose-and-drogue aerial refueling apparatus to a receiver aircraft probe and, more particularly, to apparatus and methods for in-flight hose-and-drogue refueling using electrooptical technology.

BACKGROUND OF THE INVENTION

The usefulness of air refueling became apparent to the military almost as soon as they started using aircraft. The main advantage of air refueling is obvious: it enables aircraft to stay airborne longer. Since most aircraft are incapable of taking off with maximum fuel and full payload, without in-flight refueling there is always a balance to be struck between range, payload, and fuel. Air refueling is more than just a range stretcher: it allows one to carry out missions with a smaller number of sorties, or alternatively, fewer aircraft.

Currently, two major systems are used in mid-air refueling. One is the "flying boom" method in which the tanker has a tail boom equipped with aerodynamic control surfaces, which are commanded by the boom operator. The operator, who is located at the rear section of the tanker aircraft, utilizes a steering device to guide the boom into a hatch or receptacle in the receiving aircraft's upper structure.

The second common method is the hose-and-drogue system, in which a drogue attached to the fuel hose is extended from the refueling aircraft's belly or wings. The receiver aircraft is equipped with a fixed or retractable probe. In the latter method the receiving aircraft's pilot flies the aircraft "into" the drogue.

The advantages of the hose/drogue system are the following: (a) up to three receivers can take fuel simultaneously; (b) if one hose/drogue unit (HDU) becomes unserviceable, the tanker still can offload its fuel; (c) the HDU is inherently safer than the heavy, rigid boom, which is restricted in its movements; (d) it is easier to install on non-purpose-built aircraft; and (e) it is compatible with most receivers, e.g., fixed wings, as well as rotorcraft.

There are, however, two disadvantages to the hose and drogue system: it has lower fuel transfer rates than the boom system, and the drogue is uncontrollable and is susceptible to winds and gusts. In bad weather conditions and particularly in low level refueling situations the hookup process is very difficult and demands excessive receiving aircraft pilot maneuvers. Since the aircraft &o be refueled is likely to be already low on fuel, excessive maneuvering may result in the necessity to abandon the aircraft.

U.S. Pat. No. 4,763,861 to Newman, for "Microwave Rendezvous System for Aerial Refueling," relates to a microwave rendezvous system for use on a tanker aircraft for aerial refueling of a receiver aircraft. The system comprises a microwave transmitter signaling directional data towards the receiver aircraft, providing a larger rendezvous envelope in space between the tanker and receiver aircraft, and thereby requiring less tedious navigation and attention during a refueling operation.

U.S. Pat. No. 4,763,125 to Newman, for "Light Array for Providing Passive Rendezvous Guidance between Closing Aircraft Spacecraft and the Like," relates to a light array disposed along the ventral centerline of a lead aircraft to provide passive rendezvous guidance to a closing aircraft.

U.S. Pat. No. 4,633,376 to Newman, for "Advanced Fuel Receptacle Lighting System for Aerial Refueling," relates to a lighting system mounted on a tanker aircraft for enhancing a boom operator's visual view of a fuel receptacle area on the receiver aircraft during nighttime operations.

U.S. Pats. Nos. 4,519,560 and 4,231,536 to Ishimitsu et al. both relate to a ruddevator assembly comprising a pair of airfoil configurations mounted on a boom, whose movements are controlled by creating aerodynamic forces in the vertical and horizontal directions by deflecting the airfoils with respect to the flow.

U.S. Pat. No. 4,288,845 to Fisness et al. for "Aerial Refueling Receptacle Floodlights-Spoiler and Fuselage, Nose Mounted," relates to a floodlight illuminating system for use at night in combination with an aircraft having receptacle surfaces mounted on its nose section.

U.S. Pat. No. 4,158,885 to Neuberger, for "Guidance-Light Display Apparatus and Method for In-Flight Link-up of Two Aircraft," relates to a light system for mounting on a lead aircraft so as to be visible to a pilot of a trailing aircraft for guiding such pilot in flying the trailing aircraft into predetermined in-flight link-up position with respect to the lead aircraft. The apparatus comprises an array of guidance lights arranged on the body of the lead aircraft and sensor means for producing an electrical signal representing the instantaneous position and velocity of the trailing aircraft relative to the lead aircraft.

U.S. Pat. No. 4,072,283 to Weiland, for "Aerial Refueling Boom Articulation," relates to a flying refueling boom for an aerial tanker airplane, with a mechanism for moving the boom about different axes. The motion of the boom is obtained by deflecting a pair of aerodynamic surfaces mounted on it. The motion of the aerodynamic surfaces is controlled using a cable system that allows their deflection with respect to the air stream.

U.S. Pat. No. 4,025,193 to Pond et al., for "Apparatus Suitable for Use in Orienting Aircraft In-Flight for Refueling or Other Purposes," and U.S. Pat. No. 3,917,196 to Pond et al., for "Apparatus Suitable for Use in Orienting Aircraft Flight for Refueling or Other Purposes," both relate to a system capable of measuring both receiver aircraft and refueling boom locations relative to the tanker. This information is used either to automatically orient the two aircraft and the boom and nozzle or to generate displays suitable for both pilots in order to ease the refueling process.

U.S. Pat. No. 3,285,544 to Chope et al. for "Mid-Air Refueling System," relates to a system in which a nuclear radiation source is mounted on the probe of the receiving aircraft and a directional sensitive detector is mounted on the tanker, enabling the measurement of the relative elevation and azimuth of the drogue to the probe. The above measurements are used mainly to generate displays for the pilots of the aircraft for easier engagement, although the possibility of providing drogue-steering capability by means of an aerodynamic rigid rudder and stabilizer attached to the drogue is mentioned.

SUMMARY OF THE INVENTION

The present invention overcomes the problem of drogue instability by providing a system with means for both drogue steering and drogue motion measurement, thus enabling either stabilization of the drogue or, alternatively, fully automatic hookup.

Specifically, in accordance with the present invention, a plurality of miniature, pressurized gas thrusters are mounted, preferably equally spaced, on the perimeter of the drogue in such way that activation of any thruster generates a force in a direction perpendicular to the fuel outlet nozzle. In principle, four thrusters are sufficient. Two are required to control the drogue in up-and-down motion and two in the sideways motion. The position of the drogue is measured by electrooptical position-sensing devices.

The measurement system consists of a plurality of light sources (LS) such as Light Emitting Diodes (LEDs) or Laser Diodes (LDs) mounted at a certain distance from the end of the receiving fuel probe, a plurality of sensors each comprising a lens and a position-measuring photodetector that is mounted on the perimeter of the drogue with its sensitive area directed toward the receiving aircraft, and a processing electronic circuit for calculating the position of the light-source assembly relative to the detector assembly and computing the control commands to the thrusters.

In accordance with one preferred form of the invention, the measured position of the drogue relative to the probe of the receiving aircraft is used to determine the control commands to the thrusters so that the drogue will track the position of the probe in order to achieve automatic hookup. In such an arrangement the pilot of the receiver aircraft is required to approach the vicinity of the tanker aircraft; once the two aircraft have closed to a certain distance, the automatic control system of the drogue is activated and guides the drogue until contact with the probe has been achieved.

In accordance with an alternative form of the invention, measurements are made of the drogue position relative to the tanker aircraft, either belly or wings, and are used to control the motion of the drogue so as to stabilize or, equivalently, to minimize the motion of the drogue relative to the tanker aircraft. In such an arrangement, the pilot of the receiver aircraft is required to track only the tanker and not the drogue, which is much more susceptible to wind gusts and turbulence.

DETAILED DESCRIPTION OF THE PREFERRED EMBODIMENTS

Figure 1:
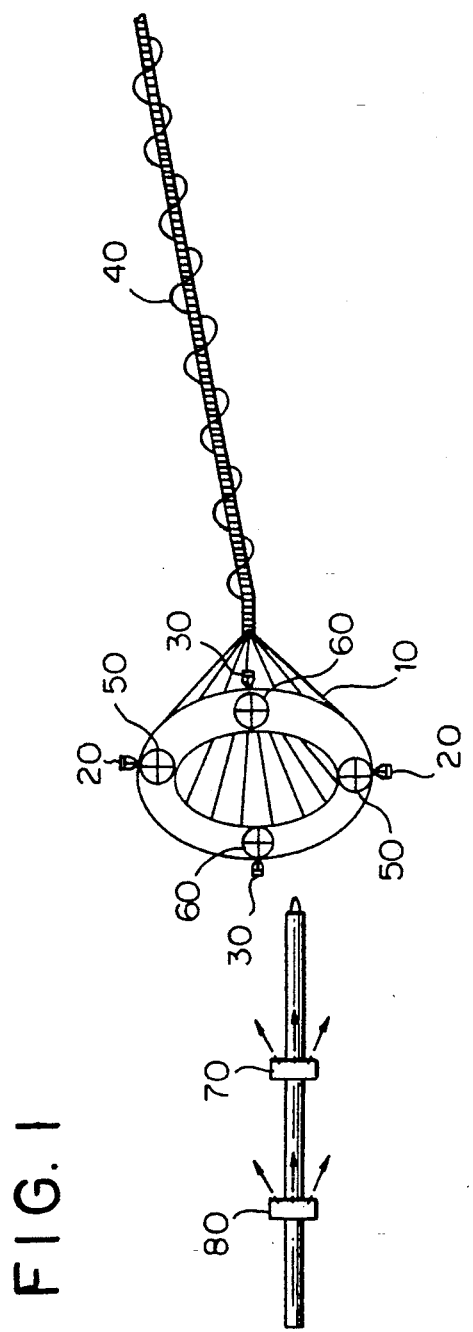
FIG. 1 is a partial perspective view of the hose and drogue unit constructed in accordance with the present invention.

FIG. 1 serves to illustrate the principle of the invention. It shows the drogue 10 having four thrusters 20 and 30 mounted on the perimeter of the drogue with their nozzles directed perpendicular to the axis of symmetry of the drogue. Thrusters 20 are used to generate forces in the up-down directions while thrusters 30 are used to generate forces in the left-right directions.

In accordance with the invention, the thrusters are energized by pressurized air supplied from a reservoir tank 92 located in the tanker belly (see FIG. 5) via supply lines 40. The reservoir tank volume is very large compared to the airflow through the thrusters during operation. Thus, the pressure in the tank and supply lines is for all practical purposes constant; therefore, no pressure build-up occurs during activation of the thrusters, and their reaction to commands is almost instantaneous. In cases where the refueling source is a wing-mounted pod in which there will not be enough room for such a reservoir, a propeller-driven compressor, which is employed in such systems for generation of the air pressure that is needed for the fuel flow, can be used to generate such air supply. Each thruster is controlled independently by electrically activating a solenoid-operated valve in each thruster. If desired, any type of nonflammable gas can be used instead of the pressurized air.

Figure 2:
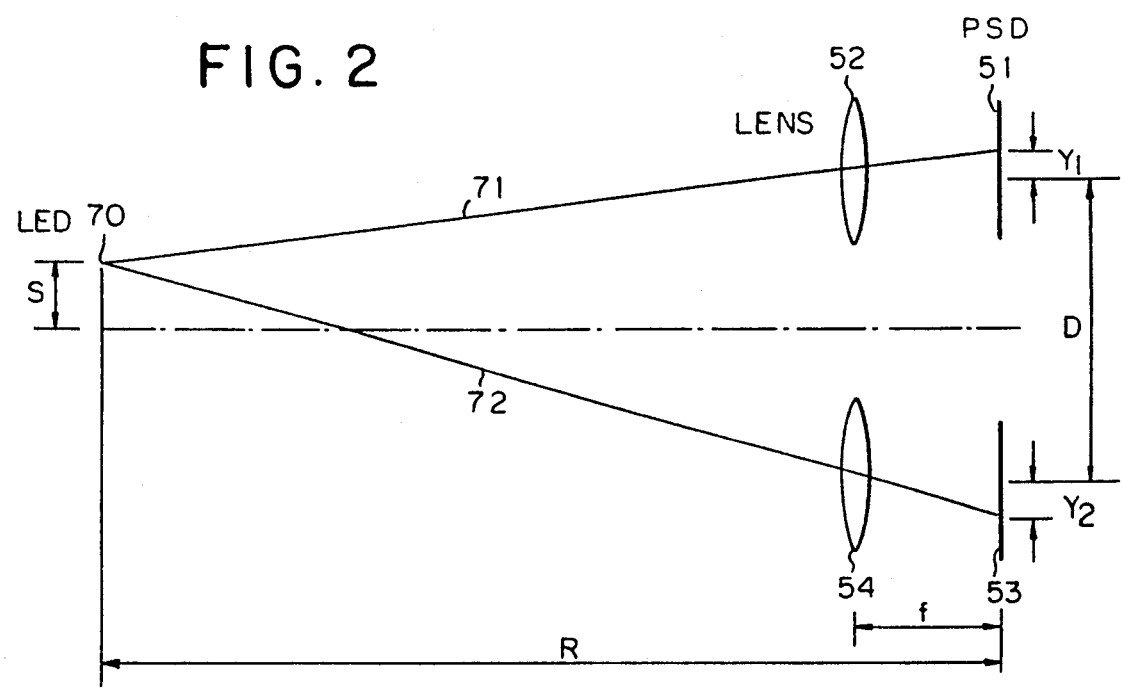
FIG. 2 is a schematic view of the electrooptical, drogue-position measurement principle.

Also mounted on the perimeter of the drogue are electrooptical sensors 50 and 60, each comprising a miniature lens 52, 54 and a position-measuring photodetector 51, 53 (see FIG. 2). Each one of the sensors detects a light source 70 mounted on the receiver aircraft probe at a certain distance from the end of the probe and measures the two-dimensional position of the image of the light source from the center of the sensor. The light source 70 consists of a single miniature light source or a ring of several miniature light sources (LS) such as LEDs or LDs distributed over the perimeter of the probe for better angular coverage. The light source can be pulsed for better identification by the system and concealment from a foe.

It may be desirable to place a second ring of light sources 80 at some distance behind the first one 70 in order to establish an axis relative to which rotation of the drogue can be measured and, if desired, altered. In order to discriminate between the two light-source assemblies, it is possible to pulse the LS assemblies at two different frequencies so that the corresponding signals can be demultiplexed; the detectors will provide a simultaneous measurement of both light sources, which is sufficient to deduce the complete spatial position and orientation of the probe relative to the drogue.

The proposed arrangement enables the measurement of the lateral and vertical displacements of the drogue relative to the probe as well as their relative distance, since it provides a stereoscopic image of the light source on the probe, as illustrated in FIG. 2. Shown in this figure are two beams of light 71 and 72 radiating from &he LED 70. These beams are collected by the lenses 52 and 54 and are projected onto the two position-sensing devices (PSDs) 51 and 53 at distances $Y_1$ and $Y_2$ from the centers of the two detectors, respectively. These distances are proportional to the distance R of the LED from the sensor and to the displacement S of the LED from the center of the sensor. Two sensors (e.g., the pair 50 or pair 60 in FIG. 1) are, in principle, sufficient for the determination of the range and the lateral and vertical displacements. However, four sensors are proposed for robustness, though three sensors are the minimum necessary for redundancy. Four sensors have the advantage of easier implementation because of symmetries.

Figure 3:
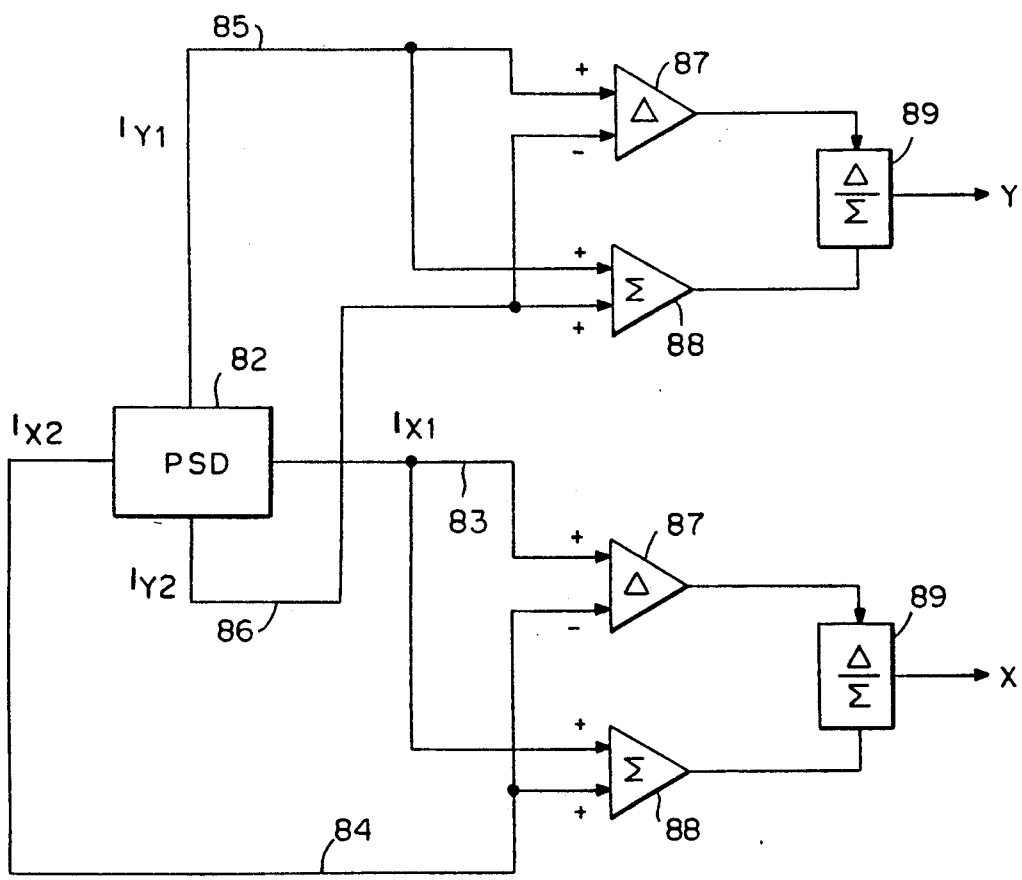
FIG. 3 is an interconnection diagram of the photodetectors.

The concept of the measurement system is depicted in FIG. 1, showing two pairs (50 and 60) of sensors mounted along the drogue periphery and light sources mounted on the probe. In each pair of sensors, each of the sensors contains a lens and a position-sensing device (PSD). The lens forms a spot of light on the surface of the PSD, corresponding to the image of the light source (FIG. 2), and the PSD 82 (FIG. 3) outputs four photocurrents $I_{x1}$ 83, $I_{x2}$ 84, $I_{y1}$ 85, and $I_{y2}$ 86 proportional to the two-dimensional distance of the centroid of the light spot from the edges of the device (FIG. 2). The coordinates X,Y of the center of the spot relative to the center of the detector are then computed by an electronic circuit that is composed of two amplifiers, one for subtraction 87 and one for summation 88, and a divider, thus yielding with the normalized differences of the appropriate pairs of current:

$$X = (I_{x1} - I_{x2})/(I_{x1} + I_{x2})$$

$$Y = (I_{y1} - I_{y2})/(I_{y1} + I_{y2})$$

The vertical displacement S of the LEDs from the center of the drogue is obtained by:

$$S = \frac{D(Y_2 - Y_1)}{2(Y_1 + Y_2)} \quad (2)$$

where $Y_1$ and $Y_2$ are the displacements of the center of the spot on the lower and upper detectors, respectively.

Similarly, the lateral displacement (not shown in FIG. 2) is obtained by replacing $Y_1$ and $Y_2$ of equation (2) by $X_1$ and $X_2$, respectively.

The distance of the probe from the drogue is obtained by:

$$R = \frac{f(D + Y_1 + Y_2)}{Y_1 + Y_2} \quad (3)$$

where f is the focal length Of the lens 52 (or 54) to the PSD 51 (or 53).

In a similar manner, the values of R, S and the lateral displacement can be obtained also from the second pair of sensors.

In principle, two sensors mounted on the drogue are sufficient to give both the off-axis displacement of the probe and the probe's distance from the drogue with sufficient accuracy. Three or four sensors may be mounted in an actual system in order to provide redundancy in failure situations and, thus, increase system robustness.

If the direction of the probe's axis (rather than only the position of its tip) is also required, a second light source 80 (another ring of infrared LEDs) may be mounted at some distance from the first one 70. These LEDs 80 will be pulsed at a different frequency from the first ones 70 so that the corresponding photocurrents can be demultiplexed and the detectors will provide a simultaneous measurement of both light sources, and that is sufficient to deduce the complete spatial position and orientation of the probe relative to the drogue.

The measurements of the electrooptical sensors are used to determine which thruster on the drogue is to be activated at any instant, the activation time and duration are chosen such that the relative distance and speed between the probe and the drogue are minimized and the relative displacement between the probe and drogue is kept smaller than the inner radius of the drogue opening.

Figure 4:
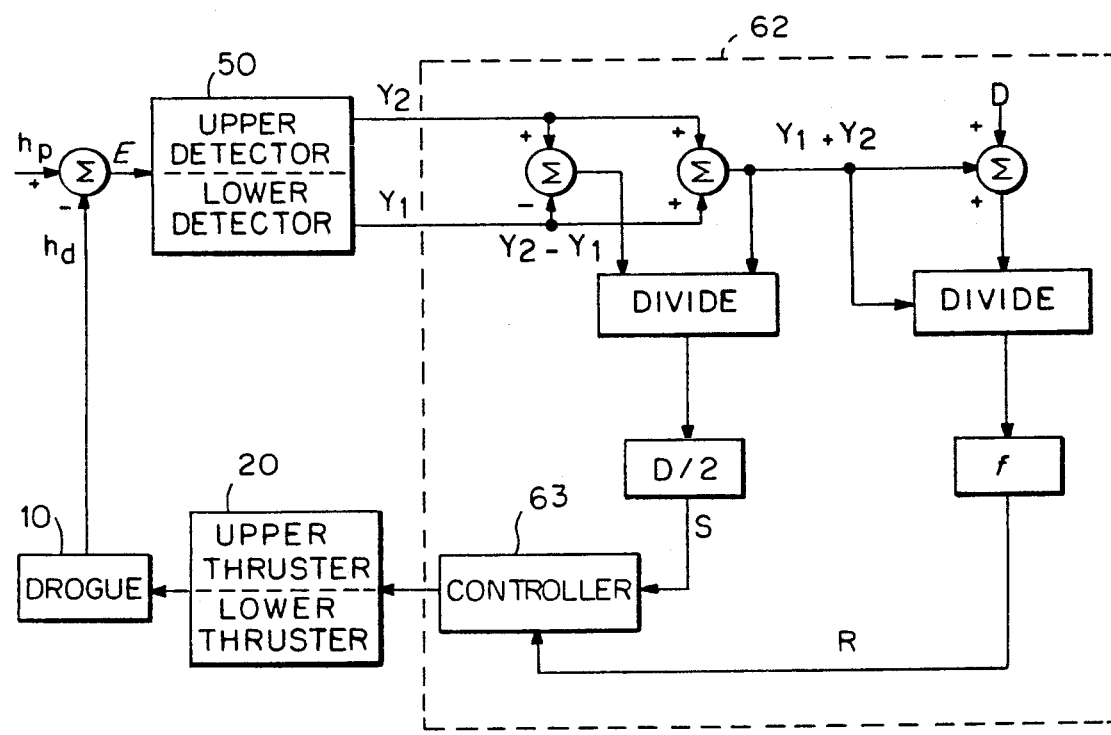
FIG. 4 is a block diagram illustrating the control scheme of the automatic drogue to probe hookup.

The signal S is used by the controller to activate the thrusters (FIG. 4). The controller logic determines which thruster is to be activated at a given instant (upper or lower) and the duration of the activation. The same logic applies for the lateral sensors and thrusters. The block diagram of the complete control system is shown in FIG. 4. It shows the pair of sensors: upper and lower 50, which detect the relative position (E) between the probe ($h_p$) and the drogue ($h_d$) and outputs two signals $Y_1$ and $Y_2$, which are processed by a digital or analog computer 62 in which Eqs. (2) and (3) are implemented, yielding the signals S and R, where S and R are, respectively, the vertical and range displacements between the probe and drogue. A control scheme 63, also implemented in the computer, utilizes the signals S and R to determine which thruster to activate (upper or lower), the activation instant, and the duration of the thrust pulse.

A similar control scheme which utilizes the two signals $X_1$ and $X_2$ is implemented to control the lateral pair 30 of thrusters. The thrusts generated by the thrusters 20 and 30 affect, respectively, the vertical and lateral motions of the drogue 10.

The signal R is used to obtain the range between the probe and the drogue. The range information is utilized in deciding when to activate the stabilization process in order to prevent expenditure of pressurized air when the receiving aircraft is far from the fueling tanker.

In the preferred configuration shown in FIG. 1, the PSDs 50 and 60 are PIN-DL10 of United Detector Technology, having an effective sensing area of $10 \times 10$ mm$^2$. Each PSD is equipped with a collecting lens having a focal length of 10 mm. The light sources 70, which are mounted on the probe of the receiving aircraft, are either four SDL-5400 laser diodes having 50 MW power, at a wavelength of approximately 830 nanometers, and operating in continuous wave (CW) mode, or alternatively, four Light Emitting Diodes (LED) type Philips CQY90A having radiation power of 21 MW at a wavelength of 930 nanometers.

In an alternative configuration, the PSDs are substituted with Four-Quadrant type photodetectors. These are Centronic QD 100-3 detectors having an active area with a diameter of 11 mm. In this arrangement, the collecting lens is defocused to ensure a light spot large enough to be sensed by all four quadrants simultaneously.

In another alternative arrangement, the photodetectors are chosen to be CCD Microcameras type Panasonic GP-MS112, which have a small head size (⅝ inch in diameter and 1 7/16 inches long) and resolution of 682 H$\times$492 V pixels. The cameras are connected by a cable to their control unit, which is placed in the aircraft's belly. The images of each pair of corresponding cameras (lateral or longitudinal) are merged using video mixers, and the resulting image is digitized at a rate of 30Hz and stored in a frame grabber (PcVision Plus of Imaging Technology, Inc.). A micro computer (PC AT type computer) is used to calculate, from the digitized images, the deviations of the probe from the drogue and the required control commands to the thrusters in order to achieve the desired automatic hook-up.

The operational procedure using the proposed system is as follows: the pilot of the receiving aircraft approaches the tanker using a separate navigation system such as the Global Positioning Satellite system (GPS) or Inertial Navigation System (INS). Once the rendezvous has been made, and the distance between the two aircraft is on the order of 10 meters or less, the automatic control system of the drogue is activated by commanding the thrusters so as to cause the drogue to track the motion of the receiving probe and to compensate for the drogue's own motion due to turbulence and wind gust. Thus, the pilot of the receiving aircraft is not required to track the drogue; he simply flies the aircraft straight ahead.

Figure 5:
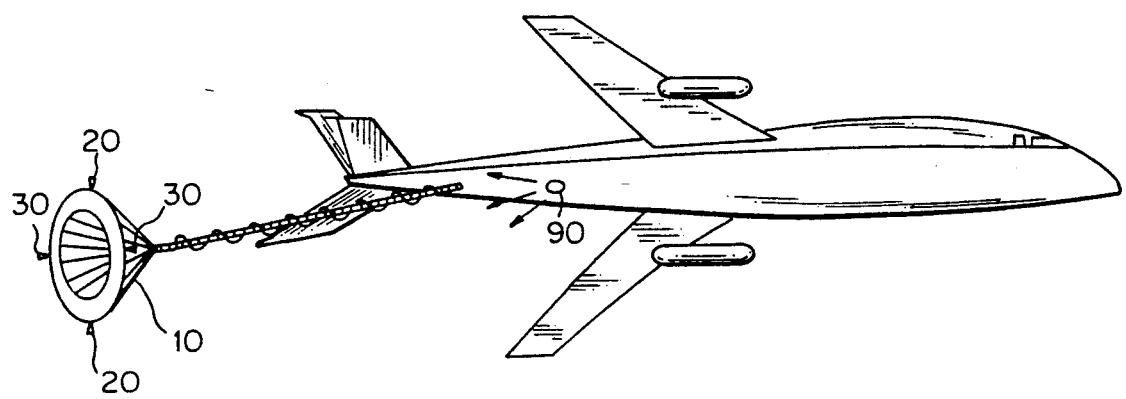
FIG. 5 is a partial perspective view of the drogue unit constructed for drogue stabilization only (without automatic hookup capability).

In an alternative configuration illustrated in FIG. 5, the LS are mounted on the fuselage 90 or wing of the refueling tanker or aircraft, and the sensors assembly is mounted on the rear side of the drogue. In this arrangement, the drogue is stabilized relative to the refueling tanker or aircraft. This method might be preferable for multiple aircraft refueling, since it guarantees adequate separation between the fuel-receiving aircraft, thus minimizing hazardous risks arising from the proximity of the aircraft. Also, this configuration might be suitable for refueling aircraft that have not been equipped with LS on their probes.

Although, in all the preferred embodiments of the invention described above, the electrooptical sensor utilizes a position-sensing device, these designs can be implemented equivalently with a different area sensor such as a four-quadrant sensor or a charge coupled device (CCD) sensor. Furthermore, while the preferred embodiments utilize four thrusters to generate thrust force to the drogue, it should be understood that a minimum of three such thrusters are necessary to generate forces in all directions. More than four thrusters could also be used.

While preferred embodiments of the invention have been illustrated and described, it will be appreciated by those skilled in the art, and others, that various changes can be made therein without departing from the spirit and scope of the invention. Some of these modifications have briefly been discussed above. Other modifications include different implementations of the electronic subsystems for interpreting the measurement information, different implementations of the mechanical subsystems for operating the thrusters, and extra and/or different locations of thrusters on the drogue.

What is claimed is:

1. An in-flight hose-and-drogue refueling system comprising, in combination:
   a) a refueling hose-and-drogue unit extending from a refueling aircraft;
   b) a refueling probe extending from an aircraft to be refueled for engaging with said refueling drogue;
   c) a light source mounted on said refueling probe;
   d) first and second electrooptical sensing means, mounted on said drogue, each for sensing the relative position of said light source on said probe in relation to said drogue and for generating signals representative of said relative positions, said second electrooptical sensing means providing redundancy with respect to said first electrooptical sensing means;
   e) a drogue steering means for steering the drogue;
   f) electronic circuit means for resolving lateral and vertical positions of the drogue relative to said light source on said probe solely from signals generated by either said first or said second electrooptical sensing means, and generating signals representative thereof;
   g) control means, connected to said electronic circuit means and to said drogue steering means, for controlling the steering of the drogue to cause the drogue to move closer to said probe based on signals received from said electronic circuit means.

2. A system according to claim 1, wherein said control means control the drogue for tracking the refueling probe for providing an automatic probe and drogue hook-up.

3. A system according to claim 1, wherein said electrooptical sensing means comprise four-quadrant photodetectors.

4. A system according to claim 1 wherein said light source comprises two rings of light sources longitudinally displaced from one another on said refueling probe, for discriminating between the rotation and the displacement of the drogue.

5. A system in accordance with claim 4, wherein each of said rings of light sources have differently modulated light beams.

6. A system in accordance with claim 1, wherein said steering means comprises a plurality of thrusters for generating force in a direction perpendicular to an axis of symmetry of the drogue.

7. A system in accordance with claim 1, wherein said drogue steering means comprises a plurality of thruster jets powered by pressurized gas.

8. A system according to claim 7, wherein the pressurized gas is a nonflammable gas.

9. A system according to claim 7, wherein a pressurized gas reservoir, having a stored mass of gas which is very large compared to the gas flow through the thruster jets during operation, is located at the refueling aircraft for energizing said thruster jets, said reservoir being connected to said thruster jets by a supply line.

10. A system in accordance with claim 1, wherein said light source is a single point source or ring source of light.

11. An in-flight hose-and-drogue refueling system comprising, in combination:
    a) a refueling hose-and-drogue unit extending from a refueling aircraft;
    b) a light source mounted on said refueling aircraft;
    c) electrooptical sensing means for sensing the relative position of said light source on said aircraft in relation to said drogue and for generating signals representative of said relative positions;
    d) a drogue steering means for steering the drogue;
    e) electronic circuit means for resolving lateral and vertical positions of the drogue relative to said light source on said refueling aircraft from signals generated by the electrooptical sensing means, and generating signals representative thereof; and
    f) control means, connected to said electronic circuit means and to said drogue steering means, for controlling the steering of said drogue to cause the drogue to maintain a constant position relative to said aircraft based on signals received from said electronic circuit means.

12. A system according to claim 11, wherein said electrooptical sensing means comprise four-quadrant photodetectors.

13. A system in accordance with claim 11, wherein said electrooptical sensing means comprises a plurality of area sensing devices distributed on a perimeter of the drogue and facing in the direction of the refueling aircraft.

14. A system in accordance with claim 11, wherein said steering means comprises a plurality of thrusters for generating force in a direction perpendicular to an axis of symmetry of the drogue.

15. A system in accordance with claim 11, wherein said drogue steering means comprises a plurality of thruster jets powered by pressurized gas.

16. A system according to claim 15, wherein the pressurized gas is a nonflammable gas.

17. A system according to claim 15, wherein a pressurized gas reservoir, having a stored mass of gas which is very large compared to the gas flow through the thruster jets during operation, is located at the refueling aircraft for energizing said thruster jets, said reservoir being connected to said thruster jets by a supply line.

18. A method for in-flight hose-and-drogue refueling in which an aircraft to be refueled has a refueling probe extending to the front thereof, the probe having a light source mounted thereon, and a refueling aircraft has a hose-and-drogue unit extending therefrom, the drogue thereof having first and second electrooptical sensing means mounted thereon each for sensing the relative position of the light source on the probe in relation to the drogue, the second electrooptical sensing means providing redundancy with respect to the first electrooptical sensing means, the drogue further having a steering means thereon, said method comprising:

sensing the relative position of the light source on the probe in relation to the drogue by means of either said first or said second electrooptical sensing means; and controlling activation of the steering means to cause the drogue to move closer to the probe.

19. A method in accordance with claim 18, wherein said steering means comprises a plurality of thruster jets powered by pressurized gas.

20. A method in accordance with claim 19, wherein a pressurized gas reservoir, having a stored mass of gas which is very large compared to the gas flow through the thruster jets during operation, is located at the refueling aircraft for energizing said thruster jets, said reservoir being connected to said thruster jets by a supply line.

21. In a drogue for use in an in-flight hose-and-drogue refueling system of an airplane and having means for engaging a refueling probe extending from another airplane, the improvement wherein the drogue further includes:

first and second electrooptical sensing means for sensing the relative position of the drogue with respect to a specific light source, said second electrooptical sensing means providing redundancy with respect to said first electrooptical sensing means;

steering means for steering the drogue; and control means, connected to said first and said second electrooptical sensing means and said steering means, for automatically steering the drogue so as to control the position of the drogue with respect to the light source in a predetermined manner, responsive to the position sensed by either said first or said second electrooptical sensing means.

22. A drogue in accordance with claim 21, wherein said control means is for controlling the position of the drogue so as to move closer to the light source.

23. A drogue in accordance with claim 22, wherein said control means is for controlling the position of the drogue so as to maintain a constant position in relation to the light source.

24. An in-flight hose-and-drogue refueling system comprising, in combination:

a) a refueling hose-and-drogue unit extending from a refueling aircraft;

b) a refueling probe extending from an aircraft to be refueled for engaging with said refueling drogue;

c) a light source mounted on said refueling probe;

d) electrooptical sensing means, mounted on said drogue, for sensing the relative position of said light source on said probe in relation to said drogue and for generating signals representative of said relative positions;

e) a drogue steering means for steering the drogue, comprising:

1) a plurality of thruster jets mounted on said drogue, 2) a pressurized gas reservoir located at the refueling aircraft, said reservoir having a stored mass of gas which is very large compared to the gas flow through the thruster jets during operation, and 3) a supply line connecting said reservoir and said thruster jets;

f) electronic circuit means for resolving lateral and vertical positions of the drogue relative to said light source on said probe solely from signals generated by said electrooptical sensing means, and generating signals representative thereof; and g) control means, connected to said electronic circuit means and to said drogue steering means, for controlling the steering of the drogue to cause the drogue to move closer to said probe based on signals received from said electronic circuit means.

25. A method for in-flight hose-and-drogue refueling in which an aircraft to be refueled has a refueling probe extending to the front thereof, the probe having a light source mounted thereon, and a refueling aircraft has a hose-and-drogue unit extending therefrom, the drogue thereof having electrooptical sensing means mounted thereon for sensing the relative position of the light source on the probe in relation to the drogue, the drogue further having a steering means thereon comprising a plurality of thruster jets mounted on said drogue, a pressurized gas reservoir located at the refueling aircraft, said reservoir having a stored mass of gas which is very large compared to the gas flow through the thruster jets during operation, and a supply line connecting said reservoir and said thruster jets, said method comprising:

sensing the relative position of the light source on the probe in relation to the drogue by means of said electrooptical sensing means; and controlling energization of said thruster jets of said steering means to cause the drogue to move closer to the probe.

26. In a drogue for use in an in-flight hose-and-drogue refueling system of an airplane and having means for engaging a refueling probe extending from another airplane, the improvement wherein the drogue further includes:

electrooptical sensing means for sensing the relative position of the drogue with respect to a specific light source;

steering means for steering the drogue comprising a plurality of thruster jets mounted on the drogue and connected by means of a supply line to a pressurized gas reservoir located at the refueling airplane, the reservoir having a stored mass of gas which is very large compared to the gas flow through the thruster jets during operation; and control means, connected to said electrooptical sensing means and said steering means, for automatically energizing the thruster jets steering the drogue so as to control the position of the drogue with respect to the light source in a predetermined manner, responsive to the position sensed by said electrooptical sensing means.

27. An in-flight hose-and-drogue refueling system comprising, in combination:
a) a refueling hose-and-drogue unit extending from a refueling aircraft;
b) a refueling probe extending from an aircraft to be refueled for engaging with said refueling drogue;
c) a light source mounted on said refueling probe, and light source comprising two rings of light sources longitudinally displaced from one another on said refueling probe for discriminating between the rotation and the displacement of the drogue;
d) electrooptical sensing means, mounted on said drogue, for sensing the relative position of said light source on said probe in relation to said drogue and for generating signals representative of said relative positions;
e) a drogue steering means for steering the drogue;
f) electronic circuit means for resolving lateral and vertical positions of the drogue relative to said light source on said probe solely from signals generated by said electrooptical sensing means, and generating signals representative thereof; and
g) control means, connected to said electronic circuit means and to said drogue steering means, for controlling the steering of the drogue to cause the drogue to move closer to said probe based on signals received from said electronic circuit means.

* * * * *